(12) United States Patent
Yamazoe

(10) Patent No.: US 6,400,115 B1
(45) Date of Patent: Jun. 4, 2002

(54) HORIZONTAL MULTI-JOINT INDUSTRIAL ROBOT AND A CONTROL METHOD THEREOF

(75) Inventor: Katsuhiro Yamazoe, Okayama (JP)

(73) Assignee: Tazmo Co., Ltd., Okayama (JP)

( * ) Notice: Subject to any disclaimer, the term of this patent is extended or adjusted under 35 U.S.C. 154(b) by 0 days.

(21) Appl. No.: 09/657,674

(22) Filed: Sep. 8, 2000

(30) Foreign Application Priority Data

Sep. 28, 1999 (JP) .......................................... 11-274739

(51) Int. Cl.[7] .................................................. B25J 9/18
(52) U.S. Cl. .............................. 318/568.11; 318/568.12; 318/568.2; 318/568.21; 901/1; 901/9; 901/39; 901/46
(58) Field of Search ....................... 318/568.11, 568.12, 318/568.2, 568.21; 901/1, 9, 39, 46; 414/2

(56) References Cited

U.S. PATENT DOCUMENTS 5,443,354 A * 8/1995 Stone et al. ................. 414/729
5,525,027 A * 6/1996 Jinno et al. .................. 414/680
5,789,890 A    8/1998 Genov et al.

* cited by examiner

*Primary Examiner*—Karen Masih
(74) *Attorney, Agent, or Firm*—Jordan and Hamburg LLP

(57) ABSTRACT

A horizontal multi-joint industrial robot has three arms of first, second and third arms which are sequentially attached from a base member, and has a robot hand which is connected to an distal end portion of the third arm. In this composition, there are two states of folding directions of arm joints with respect to a robot hand movement. When the robot hand moves in a forward direction, rotational movement of the arms is controlled so as to select one of the folding directions such that an angle between a robot hand direction and the third arm maintains 90° or more. This allows a distal end portion of the second arm to always position behind a distal end portion of the third arm with respect to the robot hand forward direction, which makes it possible to decrease a robot arm movable area that makes no contribution toward conveying a workpiece, thereby saving space for installing the robot.

1 Claim, 12 Drawing Sheets

FIG. 2
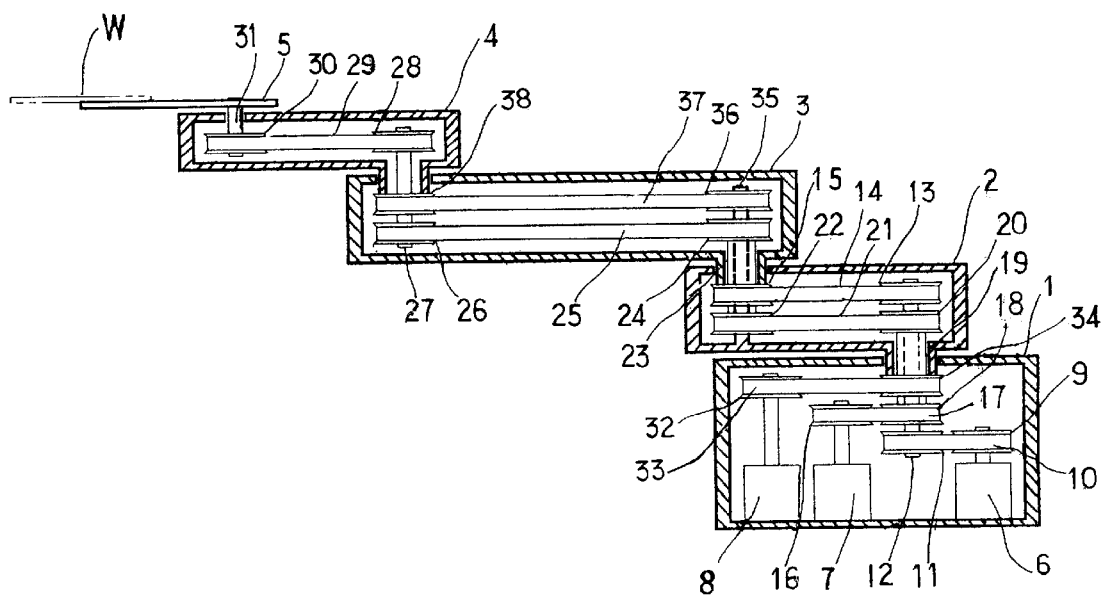
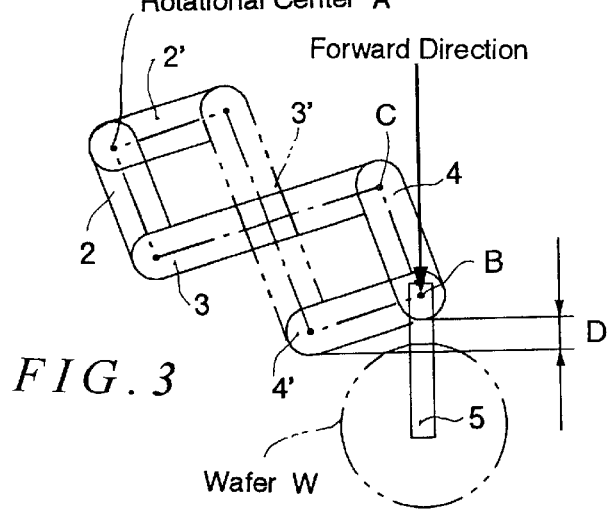
FIG. 3

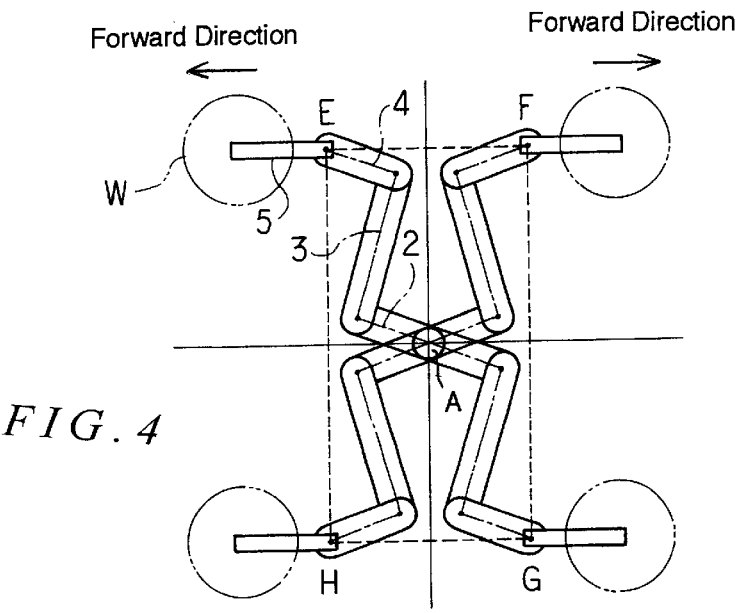
*FIG. 4*
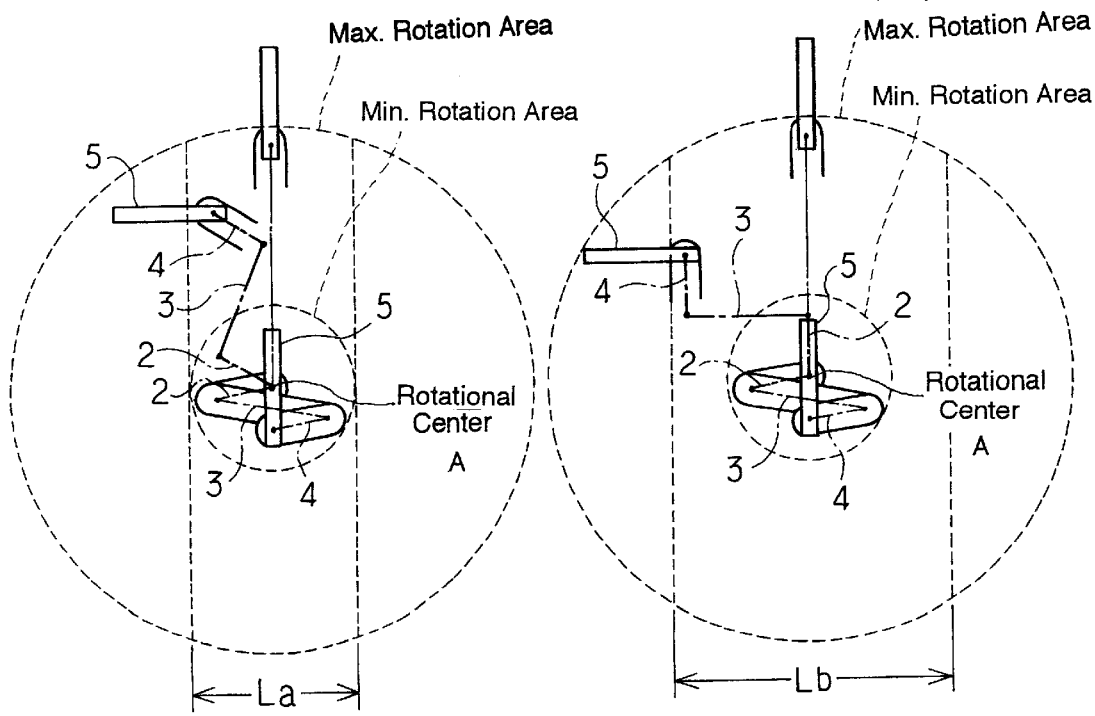
*FIG. 5(a)*          *FIG. 5(b)*

FIG. 8(a)
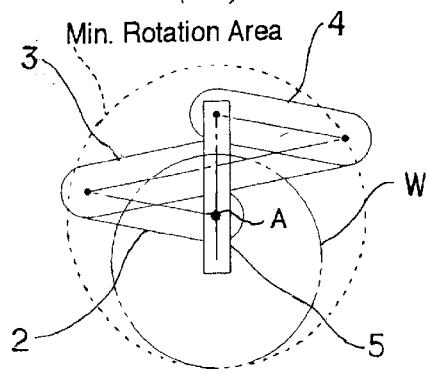
FIG. 8(b)
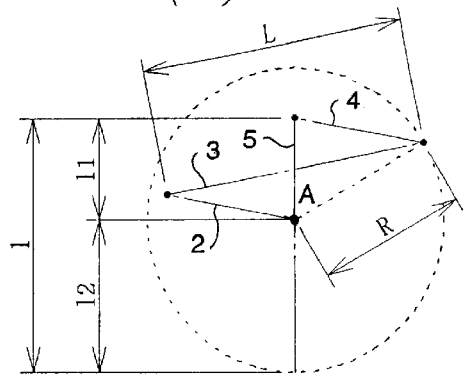
2: First Arm (L/2)
3: Second Arm (L)
4: Third Arm (L/2)
5: Hand (l 1)
W: Wafer (l 2)
$\begin{cases} R = \sqrt{(L^2 + 2\,l1^2)}/2 \\ l = l1 + l2 \end{cases}$
Min. Rotation Radius When l 2 = R in These Expressions
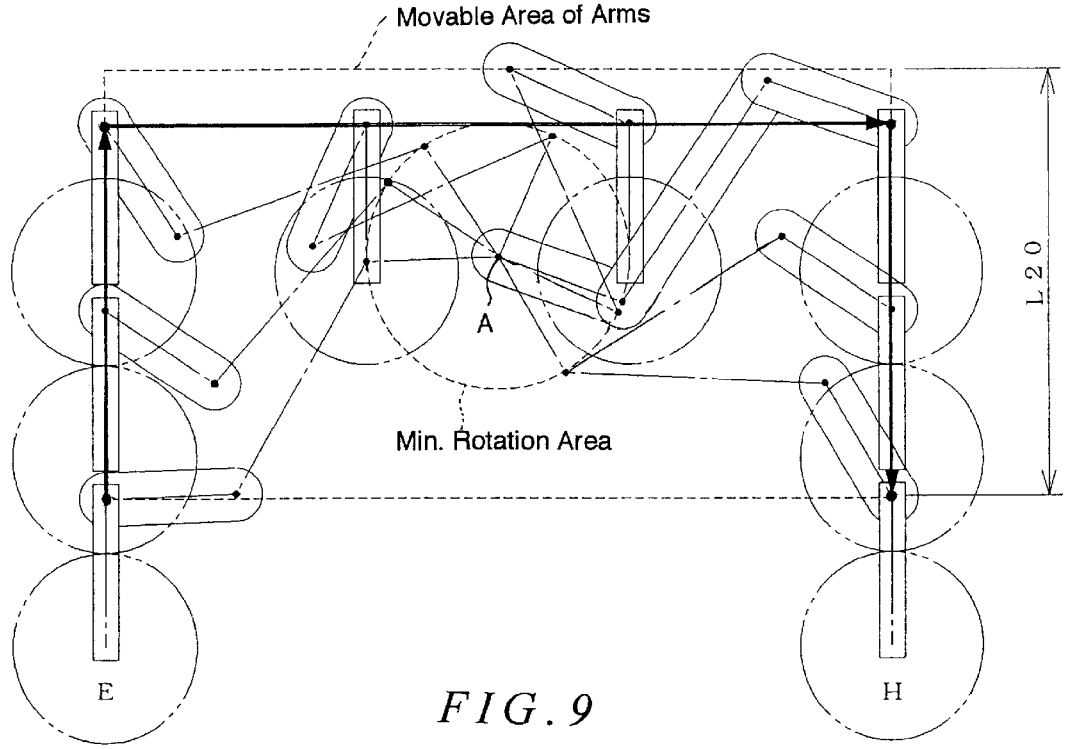
FIG. 9

Convey from R to M

Convey from Q to R

Convey from P to Q

Convey from N to H

Convey from Q to N

Convey from M to E

HORIZONTAL MULTI-JOINT INDUSTRIAL ROBOT AND A CONTROL METHOD THEREOF

BACKGROUND OF THE INVENTION

This invention relates generally to a three-degree-of-freedom and three-arm industrial robot of a horizontal multi-joint type, and particularly to an art of saving space for installing the robot.

Conventionally, there has been known an industrial robot wherein first, second and third arms are sequentially attached from a base, a robot hand for conveying a workpiece is linked to a distal end portion of the third arm, and arms and robot hand are rotated by rotational driving force. Although this robot is assumed to fold its joints into two different directions with respect to one movement position, the conventional robot is composed such that the joints always fold in one same direction.

However, the above-mentioned conventional control method of folding the joints has a problem that, when the robot is composed such that joints always fold in one same direction, a distal end portion of the second arm extends beyond the distal end portion of the third arm with respect to a forward direction of a workpiece in some position. In such a position, the distal end portion of the second arm is to obstruct the workpiece conveying, which increases a movable area that makes no contribution toward conveying the workpiece, so that space for installing the robot becomes larger.

SUMMARY OF THE INVENTION

This invention is made to solve the above-mentioned problems. The first object of the present invention is to provide a horizontal multi-joint industrial robot wherein a movement area that makes no contribution toward conveying a workpiece, is minimized by controlling folding directions of robot joints, thereby saving space for installing the robot, and provide a control method thereof.

In order to achieve the above-mentioned object, according to one aspect of the present invention, there is provided a horizontal multi-joint industrial robot in which at least three arms of first, second and third arms are sequentially attached from a base member, a robot hand is connected to a distal end portion of said third arm, said arms and robot hand are driven to rotate by driving force transmitted from a rotational driving source: wherein there are two states of folding directions of arm joints between a robot rotational center and a distal end portion of a robot hand with respect to a movement position of the robot hand, and wherein the robot comprises a control means which, when the robot hand moves in a forward direction, controls rotational motions of the arms so as to select one of said folding directions such that an angle between a robot hand direction and the third arm becomes 90° or more.

In the above-mentioned composition, owing to the folding directions of the robot joints, the distal end portion of the second arms is always positioned behind the distal end portion of the third arm with respect to the forward direction of the robot hand. This makes it possible to decrease a robot arm movable area that makes no contribution toward conveying a workpiece.

Further, in the above-mentioned horizontal multi-joint industrial robot, the control means controls so as to change over the folding direction of the robot joints between both sides as a boundary line passing through the arm rotational center in parallel to the robot hand forward direction.

Furthermore, in the above-mentioned horizontal multi-joint industrial robot, said first and third arms are approximately equal in length, always parallel, and connected so as to rotate in a same direction, and wherein the first and second arms 2 and 3 are at a ratio of 1:2 in length.

According to another aspect of the present invention, there is provided a control method of a horizontal multi-joint industrial robot in which at least three arms of first, second and third arms are sequentially attached from a base member, a robot hand is connected to an distal end portion of said third arm, said arms and robot hand are driven to rotate by driving force transmitted from a rotational driving source: wherein there are two states of folding directions of arm joints between a robot rotational center and a distal end portion of a robot hand with respect to a movement position of the robot hand, and wherein, when the robot hand moves in a forward direction, rotational movement of the arms is controlled so as to select one of the folding directions such that an angle between a robot hand direction and the third arm becomes 90° or more.

The above-mentioned control method controls so as to change over the folding direction of the robot joints between both sides as a boundary line passing through the arm rotational center in parallel to the robot hand forward direction.

BRIEF DESCRIPTION OF THE DRAWINGS

FIG. 2 is a sectional view of said robot.

FIG. 3 is a plan view showing arm movements in said robot.

FIG. 4 is view showing joint folding directions of said robot in four positions for conveying a wafer.

FIGS. 5(a) and 5(b) are views of arm rotation areas and space for installing said robot, giving a comparison by respectively showing a case of controlling folding directions of robot's joints and a case of not controlling them.

FIGS. 8(a) and 8(b) are views showing minimum rotational areas in a three-arm robot according to one embodiment of the present invention.

FIG. 9 is a view showing an example of conveying a wafer in said three-arm robot.

DETAILED DESCRIPTION OF THE PREFERRED EMBODIMENT OF THE PRESENT INVENTION

Figure 1:
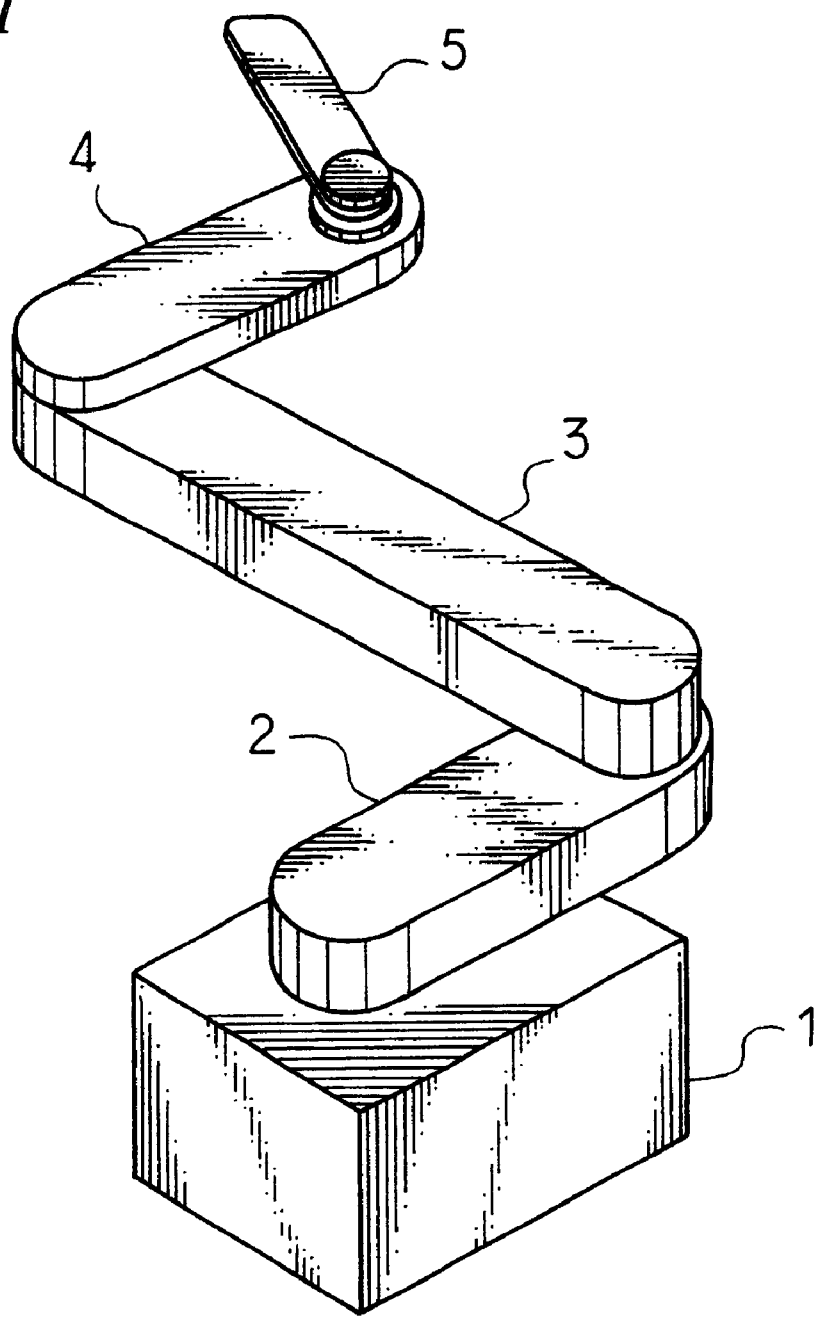
FIG. 1 is an external view of a horizontal multi-joint industrial robot according to one embodiment of the present invention.

Now, a horizontal multi-joint industrial robot that is used for conveying a wafer in a semi-conductor manufacturing factory, and a control method thereof according to one embodiment of the present invention will be explained with reference to the drawings. FIG. 1 is an external view of the horizontal multi-joint industrial robot according to one embodiment of the present invention. FIG. 2 is a sectional view of said robot. The robot of the present embodiment, which is formed in a three-degree-of-freedom and three-arm construction, has an arm structure wherein three arms of first, second and third arms 2, 3 and 4 are pivotally sequentially attached from a base 1 of a stationary side that is equipped with a rotational driving means for rotating each of arms, and the arm 4 is connected with a robot hand 5 for holding a wafer W. The base 1 includes rotation driving means: an arm extension motor 6 for rotating the second arm 3 and giving an extending motion to it, a robot hand rotation motor 7 for rotating the robot hand 5, and an arm rotation motor 8 for rotating the first and second arms 2 and 3.

As to the first arm 2, rotational driving force from the arm rotation motor 8 is transmitted through a pulley 32 fixed on an axis of said motor 8 and through a belt 33 to the first arm 2 fixed on a pulley 34, thereby rotating the first arm 2. Said rotational driving force is transmitted through a stationary axis 35 fixed on the first arm 2 and through a pulley 36 fixed on said axis, and a belt 37 to the third arm 4 fixed on a pulley 38 diameter of which has a ratio of 1:1 to that of the pulley 36, thereby rotating the third arm 4. Accordingly, since the third arm 4 is connected to the first arm 2 at a ratio of 1:1, the third and first arms 4 and 2 always rotate in a same direction, and maintain a parallel state to each other. The first and third arms 2 and 4 are approximately equal in length.

As to the second arm 3, rotational driving force from the arm extension motor 6 is transmitted through a pulley 9 fixed on an axis of said motor 6, and through a belt 10 to pulleys 11 and 13 fixed on a rotational axis 12, and then transmitted through the pulley 13 and belt 14 to the second arm 3 fixed on the pulley 15, thereby rotating the second arm 3. The first and second arms 2 and 3 are at a ratio of 1:2 in length.

As to the robot hand 5, rotational driving force from the robot hand rotation motor 7 is transmitted through a pulley 16 fixed on an axis of said motor 7, and through a belt 17 to pulleys 18 and 20 fixed on a rotational drum 19. Said pulley 20 transmits driving force through a belt 21 to pulleys 22 and 24 fixed on a rotational drum 23. Further, the pulley 24 transmits the driving force through a belt 25 to pulleys 26 and 28 fixed on the rotational axis 27. Then, the pulley 28 transmits the driving force through the belt 29 to a rotational axis 31 fixed on the pulley 30, and to a robot hand fixing said axis. This rotates the robot hand 5.

A plan view of arm movements in the above-composed robot is shown in FIG. 3. Joints of the robot can fold in two directions: a solid line state (2, 3 and 4), and a phantom line state (2', 3' and 4') with respect to one moving position. In the figure, a reference A represents a rotational center of the arms (hereinafter, referred to as robot rotational center), B a distal end portion of the third arm, and C a distal end portion of the second arm. In the arm state of the phantom line, the distal end portion of the second arm 3' is further forward than that of the third arm 4' by D, so that the distal end portion of the second arm 3' may obstruct other members, and a wafer cannot be conveyed in this position. Consequently, it is needed to control the arms so as to be always in the solid line state with respect to the wafer conveying direction. For this purpose, as later described in detail, when the robot hand 5 moves straight in a forward direction (shown by an arrow), the joints folding are controlled such that an angle between said direction of the robot hand 5 and the third arm 4 always maintains 90° or more.

FIG. 4 shows folding directions of the joints in four positions for conveying a wafer. In the figure, in order to convey the wafer W in indicated forward directions shown by arrows in each of E, F, G and H areas, the arm rotation is controlled such that the joints fold in directions shown in the figure.

FIGS. 5(a) and 5(b) are views indicating a comparison of robot arm rotation areas, and installation spaces between a case of controlling folding directions of the joints and a case of not controlling it respectively. In the case of not controlling the folding direction of the joints, in order to always make the angle between the robot hand direction and third arm 4 maintain 90° or more such that the distal end portion of the second arm 3 may not extend beyond the distal end portion of the third arm 4 when the robot hand 5 moves in a straight line, the robot installation space has to secure a width Lb shown in FIG. 5(b) that is approximately two times as the length of the second arm 3. (Notes: the first arm 2 and third arm 4 maintain a parallel state to each other) As compared with it, in the case of controlling the folding direction of the joints, the robot installation space only needs a width La shown in FIG. 5(a) that is approximately two times as the length of the first arm 2, so that, since a ratio of the first arm 2 to the second arm 3 is about 1:2, the robot installation space is about half. The folding direction of the joints is controlled by controlling motors 6, 7 and 8 through a control unit which is not shown in the figure.

Figure 6:
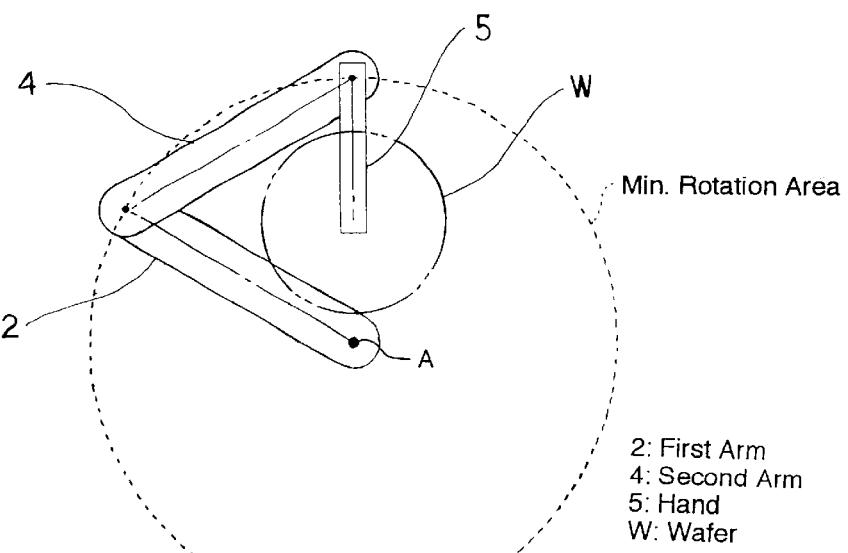
FIG. 6 is a view showing a minimum rotational area of a two-arm robot according to one embodiment of the present invention.
Figure 7:
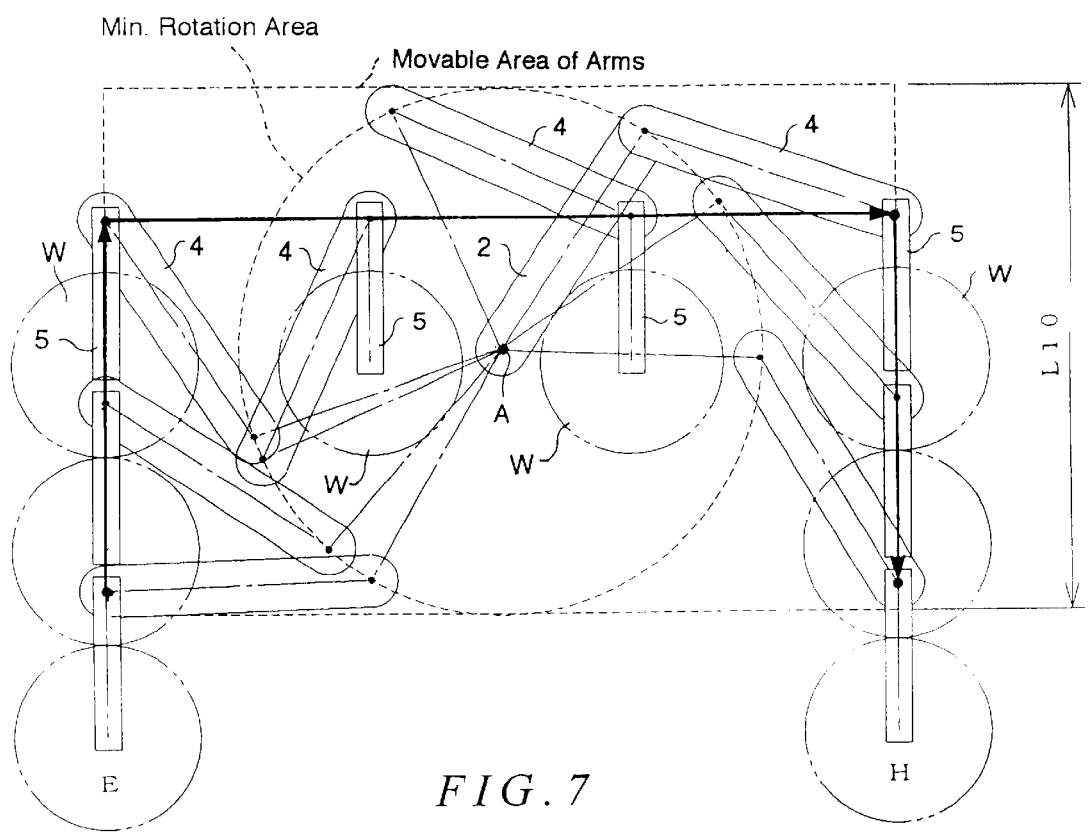
FIG. 7 is a view showing an example of conveying a wafer in said two-arm robot.

Hereinafter, the explanation is given to a comparison between a two-arm robot and a three-arm robot. FIGS. 6 and 7 show examples of a minimum rotation area and wafer conveyance in the two-arm robot respectively. FIGS. 8(a), 8(b) and 9 show examples of minimum rotation area and wafer conveyance in the three-arm robot. In the two-arm robot, the length of the first arm 2 is the minimum rotation radius. In the three-arm robot, if a sum length (l=l1+l2) of the hand 5 and wafer W is longer than a length (L/2) of the first arm 2, R determined by expressions indicated in FIG. 8(b), is the minimum rotation radius, which becomes smaller than that of the two-arm robot. When this feature is employed for conveying a wafer from E-point to H-point as shown in FIGS. 7 and 9, the arm movable area shown by a dashed-line rectangle becomes smaller in an area L20 of the three-arm robot (FIG. 9) than in an area L10 of the two-arm robot (FIG. 7), which makes it possible to reduce the robot installation area.

Figure 10:
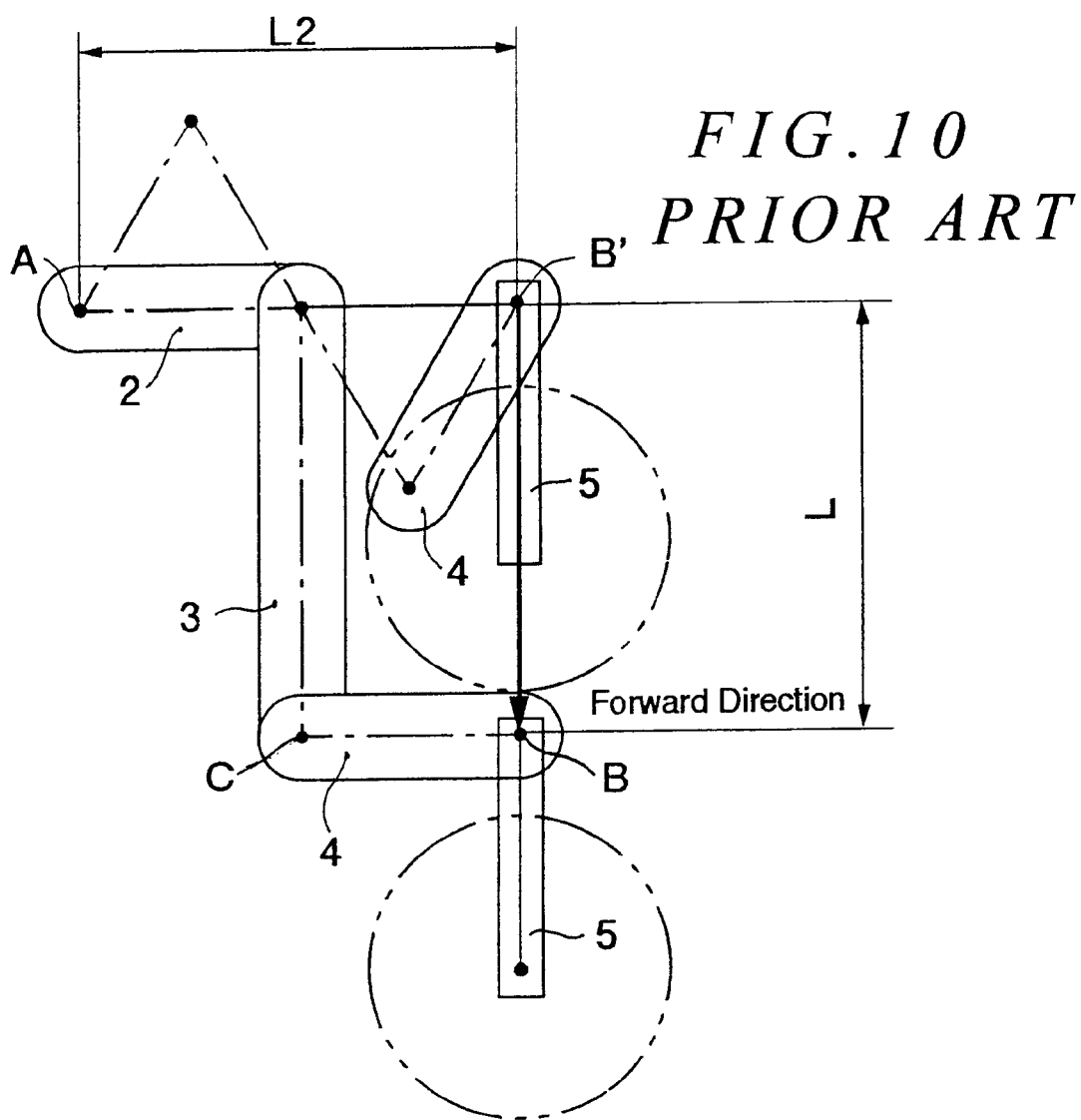
FIG. 10 is an explanatory view in a case of not controlling joints of said three-arm robot according to a conventional manner.

Nextly, the explanation is given to a comparison between a case of controlling folding directions of the joints and a case of not controlling it in the three-arm robot. In the case of not controlling the folding directions of the joints wherein the angle between the robot hand direction and third arm 4 is smaller than 90° as shown in FIG. 10, when the robot hand 5 moves straight in a forward direction from B' position which is at a distance of L2 from the rotational center A (the sum length of the first arm 2 and third arm 4 horizontally to the forward direction of the robot hand 5), in order that the distal end portion C of the second arm 3 may not extend beyond the distal end portion B of the third arm 4, the robot hand 5 has to move straight for the length (L) of the second arm 3 or more. Consequently, the robot at least needs a stroke of the length (L) as a movement area, which increases the robot installation area larger than the area in the case of employing the later-described joint control method. Besides, in this case, a position that is at a distance of L2 from the rotational center A is the maximum movement position. That is, the robot cannot move in an area beyond the distance L2.

Figure 11:
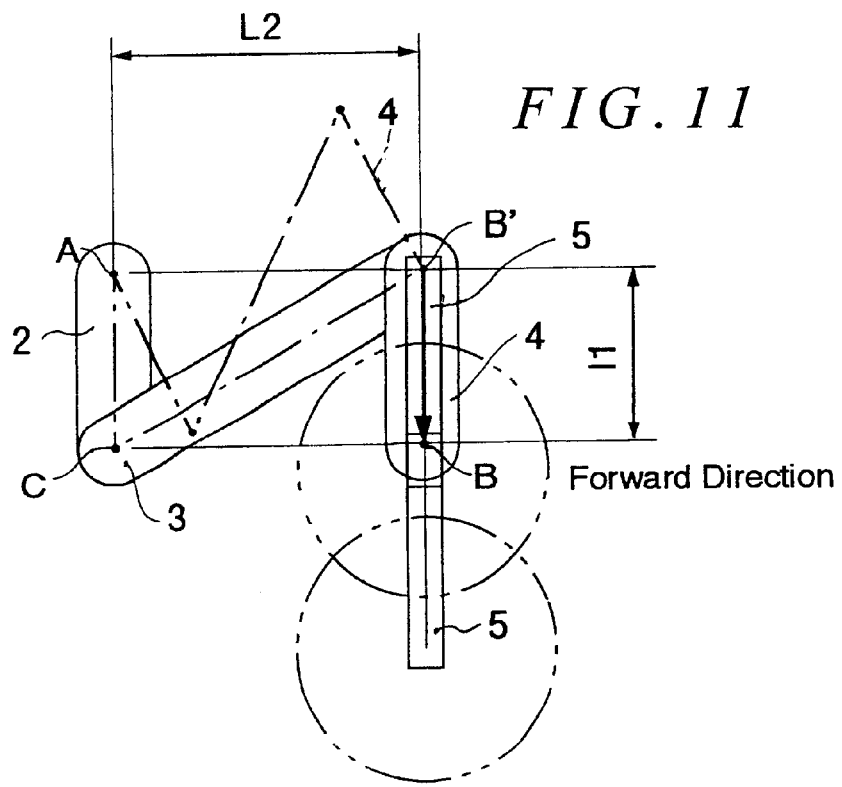
FIG. 11 is an explanatory view in a case of controlling the joints of said three-arm robot.

Compared with the above-mentioned case, in the case of controlling the joints so as to always make the angle between the forward direction of the robot hand 5 and the third arm 4 maintain 90° or more, as shown in FIG. 11, when the robot hand 5 moves straight in a forward direction from a position that is at a distance of L2 from the rotational center A (which is √3 times longer than the first arm 2 horizontally to the forward direction of the robot hand 5), the connecting part C between the first and second arms 2 and 3 (not the connecting part between the second and third arms 3 and 4) has to position behind the connecting part B between the third arm 4 and robot hand 5. For this purpose, the robot hand 5 has to move straight for the length (l1) of the first arm 2 or more from the B' position which is at a distance of L2 horizontally to the forward direction of the robot hand from the rotational center A. Thus, in the case of controlling the joints, the robot hand is required to move only for the distance of the length (l1) of the first arm 2, which is smaller than the length (L) of the second arm 3 in the above-mentioned case of not controlling the joints, which makes it possible to decrease an arm movable area that makes no contribution toward conveying a wafer.

Figure 12:
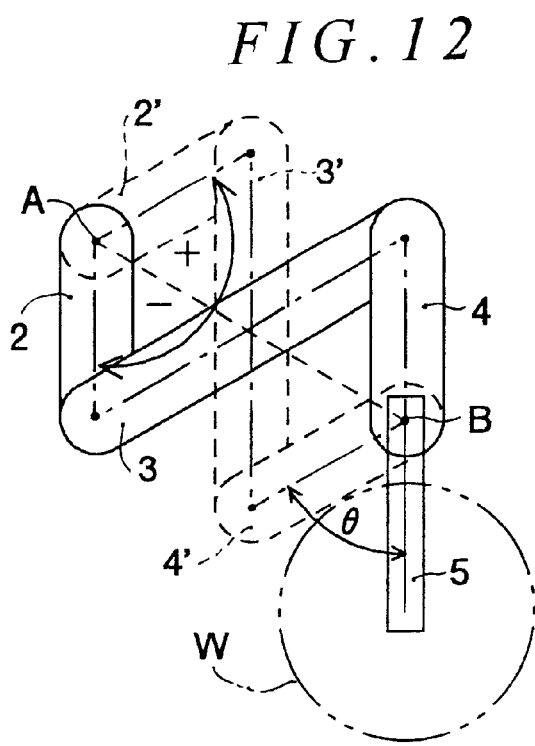
FIG. 12 is a view explaining folding directions of the robot joints.
Figure 13:
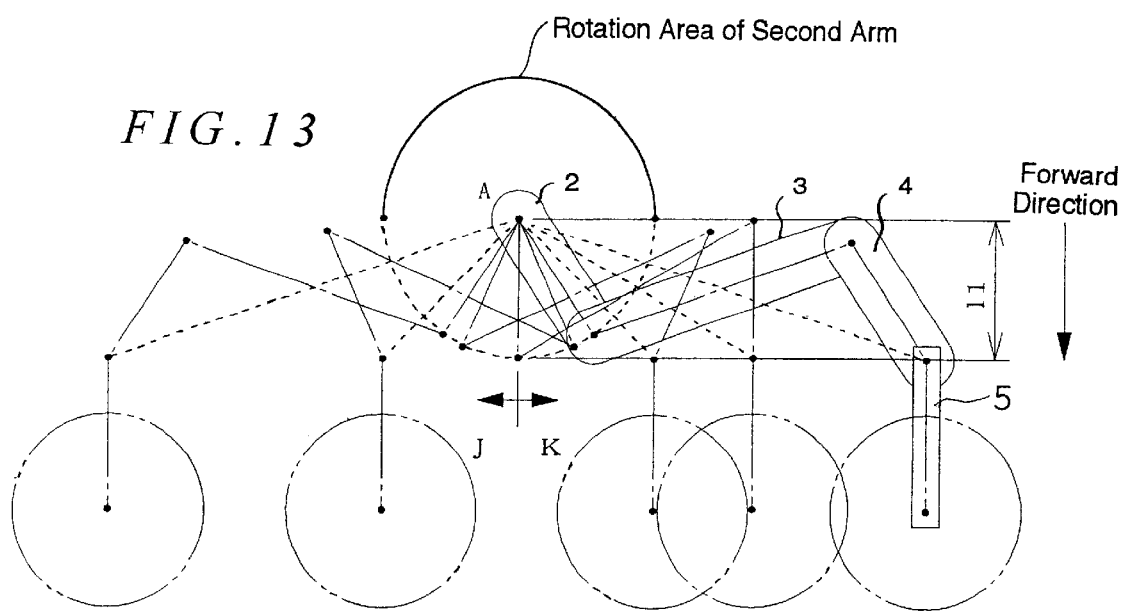
FIG. 13 is a view showing a minimum movement area in the case of controlling the folding directions of the robot joints.

As shown in FIG. 12, there are two folding directions of the robot joints: a +folding direction (shown by dashed lines) and a −folding direction (shown by solid lines) with respect to a line between a rotational center A of the robot arms and the distal end portion (a pivot of the robot hand 5) B of the third arm 4, wherein the angle between the forward direction of the robot hand 5 and the third arm 4 is assumed to be θ. FIG. 13 shows the minimum movement area from the rotational center A in the case of controlling the folding direction of the robot joints. As shown in the figure, the arm movement is controlled such that the folding direction of the joints changes over between the +folding direction and −folding direction with respect to a line extending from the rotational center A in a forward direction of the hand 5, as a boundary between respectively J-side and K-side. This allows the required movement area to be contained in a stroke of the length (l1) of the first arm 2 from the rotational center A in the forward direction of the robot hand 5, which makes it possible to decrease the robot installation area.

Figure 14:
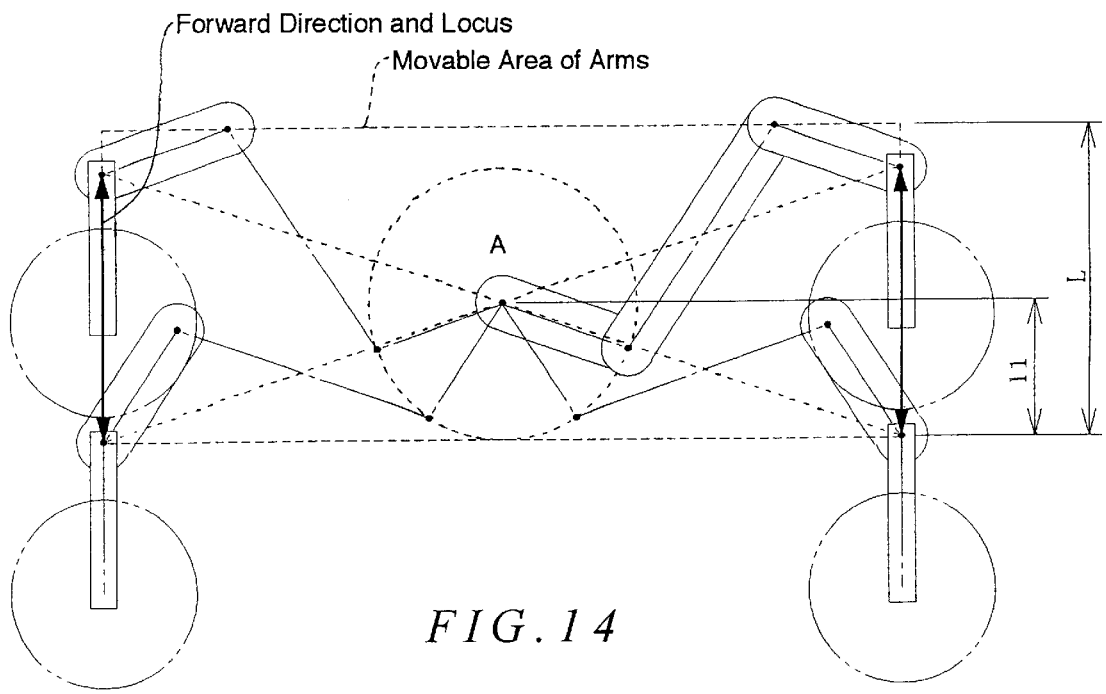
FIG. 14 is a view showing a conveying method in the case of controlling the folding directions of the robot joints.
Figure 15:
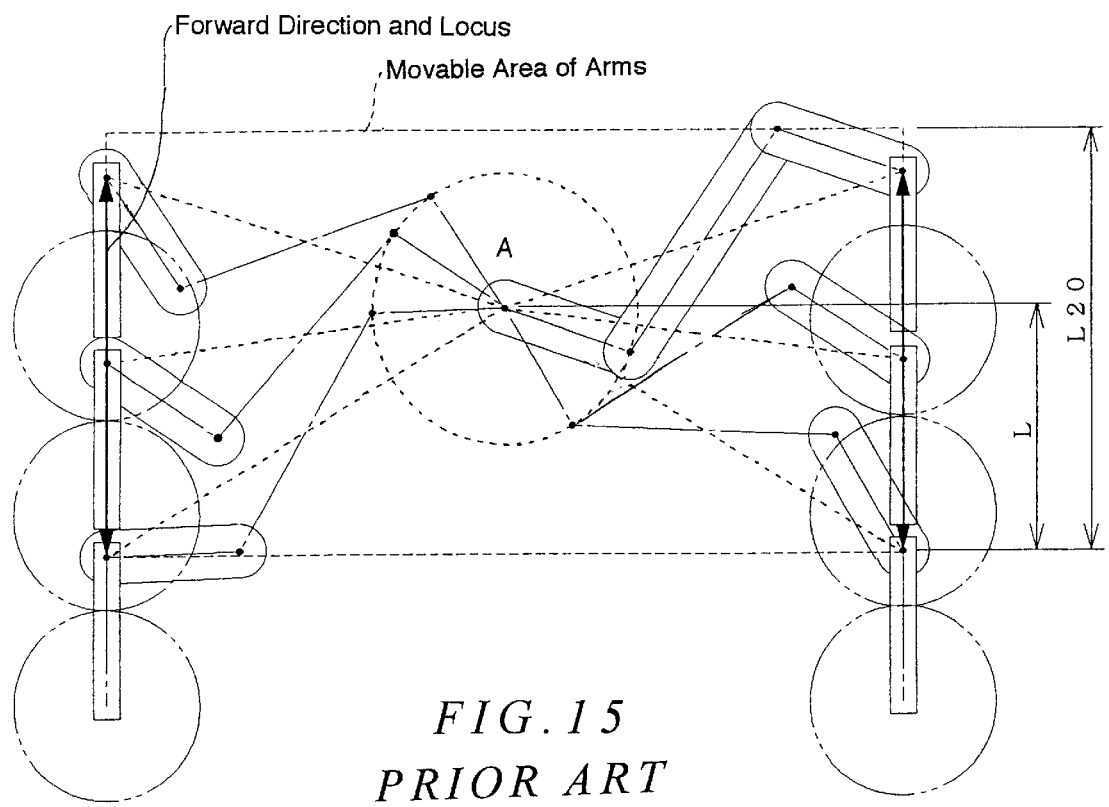
FIG. 15 is a view showing a conventional conveying method in the case of not controlling the folding directions of the robot joints.

FIG. 14 shows a wafer conveyance method with controlling the joint direction, and FIG. 15 shows a wafer conveyance method in without controlling it. In the figure, each of arrows shows a moving direction of a connecting point of the robot hand and third arm. In FIG. 14, the length of the first arm is the stroke (l1) from the robot rotational center A. In FIG. 15, the length of the second arm is the stroke (L) from the robot rotational center A. In this composition, the movable area of the arms is a rectangle indicated by dashed lines in FIGS. 14 and 15, wherein, since the first arm is shorter than the second arm, the robot installation area becomes smaller in the case of controlling the joint direction.

Figure 16:
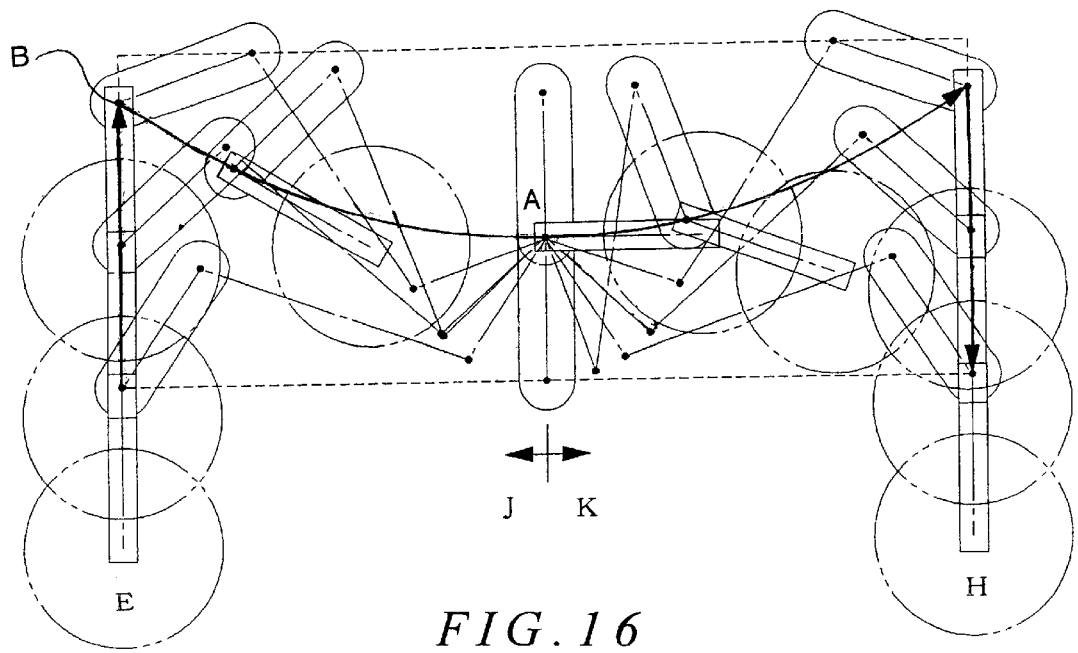
FIG. 16 is a view showing a method of conveying a wafer according to one embodiment of the present invention.
Figure 17:
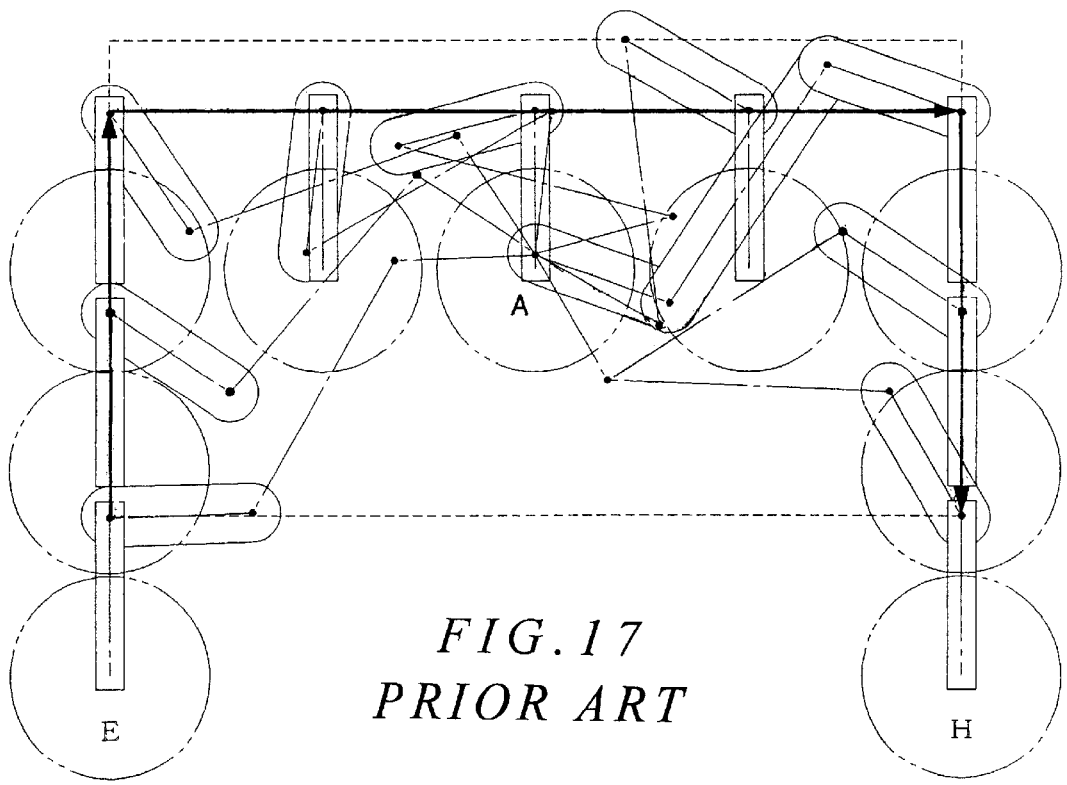
FIG. 17 is a view showing a method of conveying a wafer according to a conventional manner.

FIGS. 16 and 17 respectively show a method according to the present invention, and a conventional method for conveying a wafer from E-point to H-point. In the conventional method, joints always fold in a same direction, as shown in FIG. 17. Compared with it, the method shown in FIG. 16 wherein the folding direction of the joints changes over between J-side and K-side with respect to a line extending from the robot rotational center A in a forward direction of the robot hand, makes the pivot B of the robot hand pass over the robot rotational center A, and rotates the robot hand so as not to obstruct others.

Figure 18:
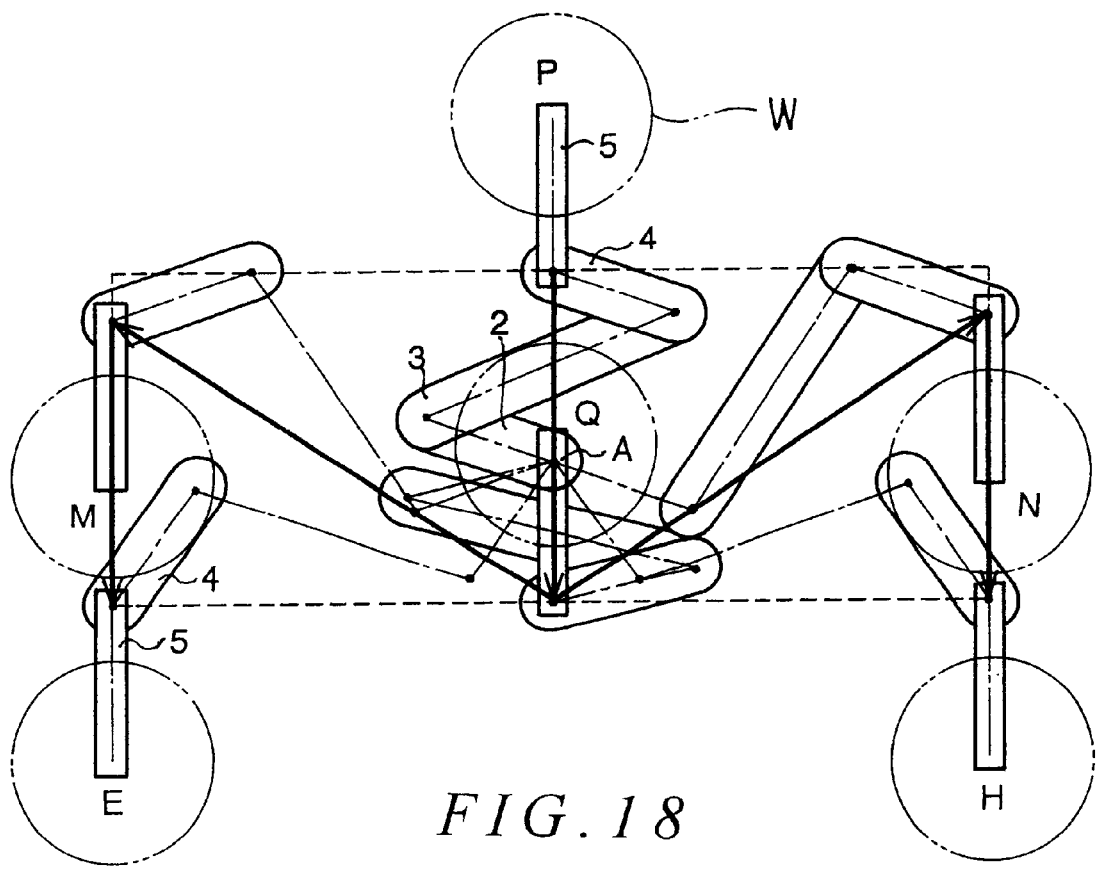
FIG. 18 is a view showing movement of conveying a wafer in the case of controlling the folding directions of the robot joints according to one embodiment of the present invention.
Figure 19C:
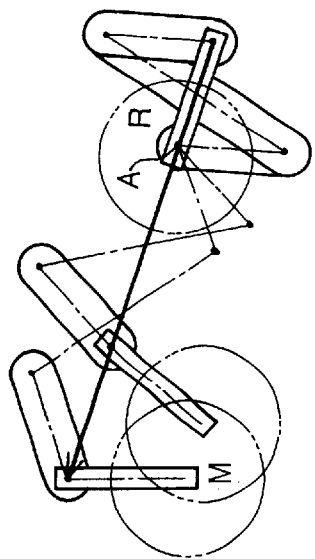
FIGS. 19(a) through 19(f) are views explaining detailed movements shown by FIG. 18.
Figure 19B:
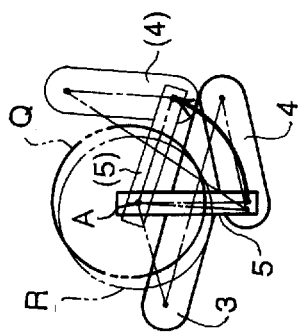
Figure 19A:
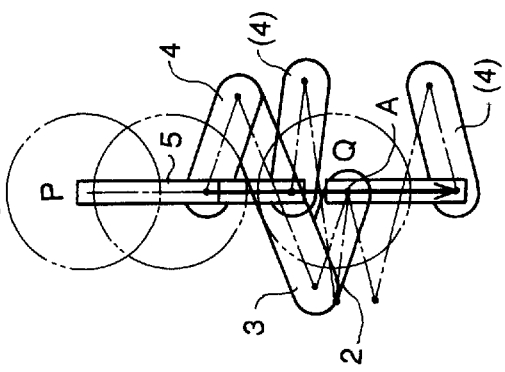
Figure 19F:
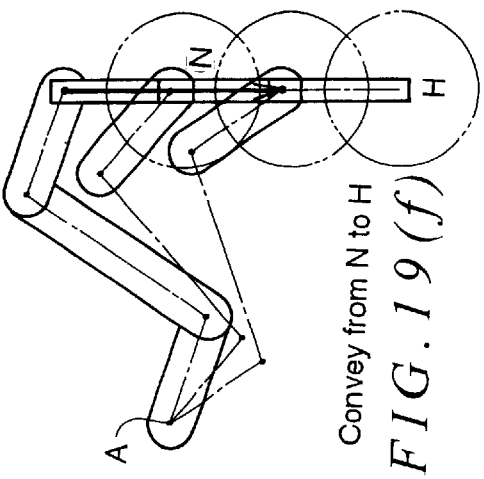
Figure 19E:
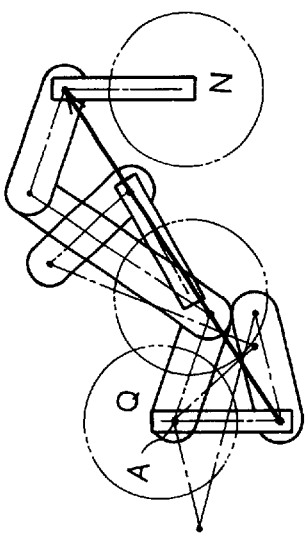
Figure 19D:
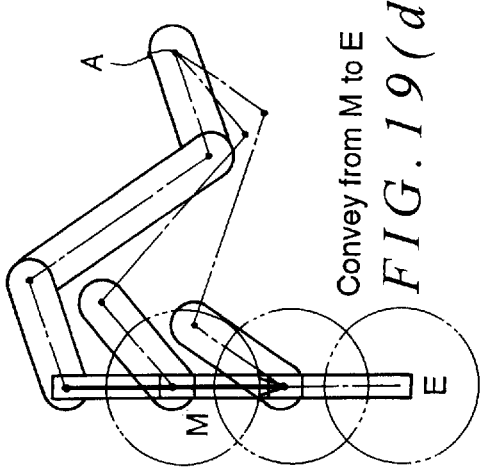

FIG. 18 shows movements for conveying the wafer W from P-point to E-point and from P-point to H-point with controlling the folding directions of the joints according to the present invention, and FIGS. 19(a) through 19(f) show detail movements of it. Referring to FIG. 19(a), first of all, the wafer is moved from P-point to Q-point in a straight line passing over the robot rotational center A. Next, as shown in FIG. 19(b), since the joint direction in E-point (FIG. 18) is reverse to that in Q-point, the arm is rotated so that the robot hand 5 comes on a line between the robot hand pivot which places the wafer in M-point (FIG. 18) and robot rotational center A, thereby moving the wafer to R-point. As shown in FIG. 19(c), in order to reverse the joint direction, the wafer is moved from R-point to M-point in a straight line passing over the robot rotational center A. At the same time, the robot hand is rotated 180°. At the end, as shown in FIG. 19(d), the wafer is moved from M-point to E-point in a straight line.

As to the movement from P-point to H-point, as shown in FIG. 19(a), the wafer is firstly moved from P-point to Q-point in a straight line passing over the robot rotational center A. Then, as shown in FIG. 19(e), since the joint direction in H-point (FIG. 18) is same as that in Q-point, the wafer is moved from Q-point to N-point in a straight line. At the same time, the robot hand is rotated 180°. At the end, as shown in FIG. 19(f), the wafer is moved from N-point to H-point in a straight line.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, although the above embodiment shows the composition in which rotational driving means (arm extension motor 6, robot hand rotation motor 7, and arm rotation motor 8) for rotating the arms and robot hand are located in the base 1, and they transmit the rotational driving force to arms through pulleys, belts and so forth, not limited to this composition, a composition in which each of arms includes a rotational driving source, can also be applied.

What is claimed is:

1. A horizontal multi-joint industrial robot comprising:

a base member having a robot rotational center with respect to which a forward direction and a center line parallel thereto are defined;

at least first, second and third arms sequentially attached from the base member, the first arm having a proximal end rotatably connected to said base member at the robot rotational center and a distal end, the second arm having a proximal end rotatably attached to said distal end of said first arm and a distal end, and said third arm having a proximal end rotatably attached to said distal end of said second arm and a distal end wherein each of said first, second and third arms has a first and second folding states with respect the robot rotational center;

said first and third arms being approximately equal in length and said first and second arms having a length ratio of 1:2;

a robot hand connected to said distal end of said third arm;

a rotational driving source for rotating said first, second, and third arms and said robot hand;

control means for controlling said first, second and third arms and said robot hand such that:
the robot hand moves with a robot hand direction parallel to the forward direction;
rotational motions of the arms are controlled so that said folding states are limited to produce an angle between the robot hand direction and the third arm of 90° or more when the robot hand is moved in the forward direction to a destination;
the folding states of said first, second, and third arms are alternated when said robot hand moves pass the center line; and
said first and third arms are maintained parallel.

* * * * *